United States Patent
Zhang

(10) Patent No.: US 12,407,850 B2
(45) Date of Patent: Sep. 2, 2025

(54) MOTION ESTIMATION METHOD AND APPARATUS, ELECTRONIC DEVICE AND READABLE STORAGE MEDIUM

(71) Applicant: VIVO MOBILE COMMUNICATION CO., LTD., Dongguan (CN)

(72) Inventor: Yong Zhang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 71 days.

(21) Appl. No.: 18/380,640

(22) Filed: Oct. 16, 2023

(65) Prior Publication Data
US 2024/0048753 A1    Feb. 8, 2024

Related U.S. Application Data

(63) Continuation of application No. PCT/CN2022/086324, filed on Apr. 12, 2022.

(30) Foreign Application Priority Data

Apr. 16, 2021 (CN) .................. 202110412068.0

(51) Int. Cl.
*H04N 7/12* (2006.01)
*H04N 19/139* (2014.01)
(Continued)

(52) U.S. Cl.
CPC ......... *H04N 19/513* (2014.11); *H04N 19/139* (2014.11); *H04N 19/176* (2014.11)

(58) Field of Classification Search
CPC .. H04N 19/513; H04N 19/139; H04N 19/176; H04N 19/533; H04N 19/56; H04N 19/57
See application file for complete search history.

(56) References Cited

U.S. PATENT DOCUMENTS

| | | | |
|---|---|---|---|
| 8,098,733 B2* | 1/2012 | Veremeev | H04N 19/61 375/240.01 |
| 2006/0133496 A1 | 6/2006 | Tsai | |

(Continued)

FOREIGN PATENT DOCUMENTS

| | | |
|---|---|---|
| CN | 101815218 A | 8/2010 |
| CN | 103793925 A | 5/2014 |

(Continued)

OTHER PUBLICATIONS

Extended European Search Report issued in related European Application No. 22787522.6, mailed Apr. 29, 2024, 13 pages.

(Continued)

*Primary Examiner* — Gims S Philippe
(74) *Attorney, Agent, or Firm* — IPX PLLC

(57) ABSTRACT

The present application provides a motion estimation method and apparatus, an electronic device, and a readable storage medium. The method includes: according to a motion vector of a previous frame of a target position in a target macroblock, determining a first search range for asymmetrical cross search; and according to the motion vector of the previous frame of the target position in the target macroblock and a motion vector of the previous two frames of the target position in the macroblock, determining a second search range for extended multi-level hexagonal grid search.

12 Claims, 8 Drawing Sheets

(51) Int. Cl.
*H04N 19/176* (2014.01)
*H04N 19/513* (2014.01)

(56) References Cited

U.S. PATENT DOCUMENTS

| | | | | |
|---|---|---|---|---|
| 2008/0112487 | A1* | 5/2008 | Park | H04N 19/567 |
| | | | | 375/240.16 |
| 2010/0061458 | A1* | 3/2010 | Panusopone | H04N 19/567 |
| | | | | 375/E7.123 |
| 2012/0106642 | A1 | 5/2012 | Letunovskiy et al. | |
| 2013/0223532 | A1* | 8/2013 | Xi | H04N 19/433 |
| | | | | 375/240.16 |
| 2014/0219355 | A1* | 8/2014 | Goto | H04N 19/56 |
| | | | | 375/240.16 |
| 2016/0080760 | A1* | 3/2016 | Nakaishi | H04N 19/57 |
| | | | | 375/240.16 |
| 2016/0127741 | A1* | 5/2016 | Possos | H04N 19/96 |
| | | | | 375/240.16 |

FOREIGN PATENT DOCUMENTS

| | | |
|---|---|---|
| CN | 112203095 A | 1/2021 |
| CN | 113115038 A | 7/2021 |

OTHER PUBLICATIONS

Xu X et al: "Modification of UMHexagonS Fast ME", 18. JVT Meeting; 75. MPEG Meeting; Jan. 15, 2006 , XP030006352.

Xingyu Wen et al: "Optimization on motion estimation algorithm based on H. 264", Aug. 20, 2010, pp. V5-590, XP031758908.

Chen:"Fast Motion Estimation for JVT", 7. JVT Meeting; 64. MPEG Meeting; Mar. 14, 2003, XP030005680.

Chen: "Fast Integer and Fractional Pel Motion Est", 6. JVT Meeting; 63. MPEG Meeting; Dec. 2002, XP030005588.

International Search Report issued in corresponding International Application No. PCT/CN2022/086324, mailed Jun. 20, 2022, 4 pages.

Xie, LiFen , "UMHexagonS Search Algorithm for Fast Motion Estimation", 2011 3rd International Conference on Computer Research and Development, May 2011, 5 pages.

Huang, Peng et al., "Irregularity-cross multi-hexagon-grid Search Algorithm for FastMotion Estimation on H.264", 2010 2nd International Conference on Computer Engineering and Technology, Jun. 2010, 6 pages.

Xueqian Liu et al., "Optimization Algorithm for Motion Estimation Based on UMHexagonS", Television Technology, vol. 38, Issue 09, Sep. 2014.

* cited by examiner

MOTION ESTIMATION METHOD AND APPARATUS, ELECTRONIC DEVICE AND READABLE STORAGE MEDIUM

CROSS-REFERENCE TO RELATED APPLICATIONS

This application is a continuation of International Application No. PCT/CN2022/086324, filed Apr. 12, 2022, which claims priority to Chinese Patent Application No. 202110412068.0, filed Apr. 16, 2021. The entire contents of each of the above-referenced applications are expressly incorporated herein by reference.

TECHNICAL FIELD

This application relates to the field of communication technology, and specifically to a motion estimation method and apparatus, an electronic device, and a readable storage medium.

BACKGROUND

Video coding is based on the high correlation of video signals and the visual characteristics of the human eye, and through appropriate coding methods, eliminates the redundancy caused by various correlations and characteristics of the human eye to compress video signals and reduce the transmission bit rate. The correlation of video signals can be divided into temporal correlation and spatial correlation. Spatial correlation refers to the similarity between adjacent pixels in a same image, which is mainly eliminated by intra-frame prediction coding: temporal correlation refers to the similarity between adjacent images in an image sequence and is mainly eliminated by inter-frame prediction coding. Inter-frame prediction coding is also called Motion Compensated Prediction (MCP) coding. The purpose of inter-frame prediction coding is to find the most similar block (matching block) for the current image coding block, and according to a position of a prediction block, obtain the relative offset of the spatial positions between the two, that is, a Motion Vector (MV). The process of obtaining the motion vector by searching is called Motion Estimation (ME), and the process of finding the prediction block from a specified reference frame according to the motion vector is called motion compensation. The principle of predictive coding is shown in FIG. 1 in detail.

Motion estimation is the key technology of predictive coding. The more accurate the motion estimation is, the higher the image quality of prediction compensation is, the smaller the compensation residual is, the fewer bits are required for compensation coding, and the lower the bit rate is. At the same time, in order to find the block most similar to the current block, a lot of search work is required. Motion estimation is the most computationally complex module in video coding, and its computational complexity usually accounts for 50-70% of the entire coder.

Motion estimation methods include full search and fast search. The full search method is to search all points within the search range in order, compare cost functions point by point, and select a point that minimizes the cost function, that is, the optimal point. Full search needs to traverse all pixels within the search range, and can find the optimal solution of the cost function of the block, but the complexity is also the highest. The basic idea of the fast search method is to reduce the number of candidate search points, and usually it is necessary to design a series of effective search modes to find the optimal solution with as few search points as possible. The current fast search method has a large number of candidate search points, and there is still a large redundancy between the search points, and it is easy to fall into local optimum during the search and matching process.

SUMMARY

The present application provides a motion estimation method and apparatus, an electronic device, and a readable storage medium.

According to a first aspect, the embodiment of the present application provides a motion estimation method, the method is executed by an electronic device, and the method includes:
  searching for a start search point in a target macroblock to obtain a start search point;
  in a case that it is determined, according to a cost value of the start search point, that early termination is not performed, determining a first search range according to a motion vector of a previous frame of a target position in the target macroblock:
  performing an asymmetrical cross search according to the first search range to obtain a first target search point;
  in a case that it is determined, according to the cost value of the start search point and a cost value of the first target search point, that early termination is not performed, performing rectangular window full search to obtain a second target search point;
  in a case that it is determined, according to the cost value of the start search point and a cost value of the second target search point, that early termination is not performed, determining a second search range according to the motion vector of the previous frame of the target position in the target macroblock and a motion vector of previous two frames of the target position in the macroblock;
  performing extended multi-level hexagonal grid search according to the second search range, to obtain a third target search point;
  in a case that it is determined, according to the cost value of the start search point and a cost value of the third target search point, that early termination is not performed, performing extended hexagonal search to obtain a fourth target search point; and
  determining a motion vector of the target macroblock according to the fourth target search point.

According to a second aspect, an embodiment of the present application provides a motion estimation apparatus, the apparatus is applied to an electronic device, and the apparatus includes:
  a first search module, configured to search for a start search point in a target macroblock to obtain a start search point:
  a first determination module, configured to: in a case that it is determined, according to a cost value of the start search point, that early termination is not performed, determine a first search range according to a motion vector of a previous frame of a target position in the target macroblock;
  a second search module, configured to perform an asymmetrical cross search according to the first search range to obtain a first target search point;
  a third search module, configured to: in a case that it is determined, according to the cost value of the start search point and a cost value of the first target search point, that early termination is not performed, perform rectangular window full search to obtain a second target search point:

a second determination module, configured to: in a case that it is determined, according to the cost value of the start search point and a cost value of the second target search point, that early termination is not performed, determine a second search range according to the motion vector of the previous frame of the target position in the target macroblock and a motion vector of previous two frames of the target position in the macroblock;

a fourth search module, configured to perform extended multi-level hexagonal grid search according to the second search range, to obtain a third target search point:

a fifth search module, configured to: in a case that it is determined, according to the cost value of the start search point and a cost value of the third target search point, that early termination is not performed, perform extended hexagonal search to obtain a fourth target search point; and a third determination module, configured to determine a motion vector of the target macroblock according to the fourth target search point.

According to a third aspect, the embodiments of the present application provide an electronic device, where the electronic device includes a processor, a memory, and a program or an instruction stored in the memory and executable on the processor, and when the program or the instruction is executed by the processor, the steps of the motion estimation method according to the first aspect are implemented.

According to a fourth aspect, the embodiment of this application provides a readable storage medium. The readable storage medium stores a program or an instruction, and when the program or the instruction is executed by a processor, the steps of the motion estimation method in the first aspect are implemented.

According to a fifth aspect, an embodiment of this application provides a chip. The chip includes a processor and a communication interface. The communication interface is coupled to the processor, and the processor is configured to run a program or instructions to implement the method according to the first aspect.

According to a sixth aspect, an embodiment of the present application further provides a computer program product stored in a nonvolatile storage medium, and the computer program product is executed by at least one processor to implement steps of the foregoing method.

According to a seventh aspect, the embodiment of the present application further provides a motion estimation apparatus, and the apparatus is configured to execute the foregoing method.

The embodiment of the present application optimizes the selection of the search range in the motion estimation process of video coding, which can determine the optimal matching block and the optimal motion vector more accurately and quickly, avoiding the search from falling into local optimum, reducing computational complexity and coding time, and improving the efficiency and effectiveness of video coding.

DETAILED DESCRIPTION

Figure 1:
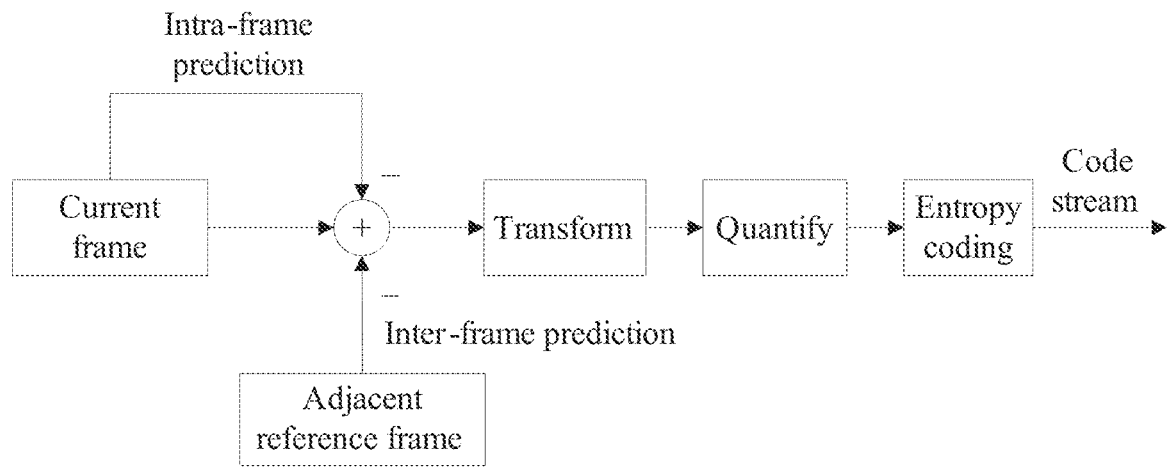
FIG. 1 is a schematic diagram of the principle of predictive coding.

The following describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on embodiments of this application without creative efforts shall fall within the protection scope of this application.

In the specification and claims of this application, the terms "first", "second", and the like are intended to distinguish between similar objects but do not describe a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

In order to better understand the solutions of the embodiments of the present application, the following contents are firstly introduced.

In order to reduce the complexity of motion estimation, a series of fast search methods are proposed. The basic idea of the fast search method is to reduce the number of candidate search points, and usually it is necessary to design a series of effective search modes to find the optimal solution with as few search points as possible. The more classic methods include: three step search (TSS) algorithm, novel three step search (NTSS) algorithm, four step search (FSS) algorithm, block-based gradient descent search (BBGDS) algorithm, diamond search (DS) algorithm and hexagon-based search (HEXBS) algorithm based on center bias distribution characteristics of motion vectors: and motion vector field adaptive search technology (MVFAST), unsymmetrical-cross multi-hexagon grid search (UMHexagonS), and enhanced predictive zonal search (EPZS) based on spatiotemporal correlation of motion vectors. The main basis of the above fast search algorithm is that starting from the optimal position, the prediction distortion increases monotonously with the distance. Therefore, execution of motion estimation starts from a search position, finds a position with the least distortion in each round of search, then starts the next round of search based on this position, and finally reaches the optimal position. These fast search algorithms generally use a compact center-biased search pattern to obtain the optimal solution in the fastest way.

UMHexagonS Algorithm

UMHexagonS search adopts meticulous global search, combined with a small-scale local search strategy, uses multi-level and multi-shaped templates for matching, and uses spatiotemporal correlation to estimate motion vectors. The UMHexagonS search method has the following characteristics:

(1) The start point prediction adopted by the UMHexagonS method comprehensively utilizes the motion vector correlation of intra-frame and inter-frame adjacent blocks, and motion correlation of blocks of different sizes brought about by the macroblock division technology, and therefore it can select a point that can best reflect the current block motion trend as the start point, which improves the accuracy of the estimation.

(2) The search in each step of the UMHexagonS method is related to the image content, and its search templates are divided into three categories: large-scale coarse search mixed templates, fine search medium hexagonal templates, and fine search small diamond templates. Search performance has been further improved by performing different searches on different content.

(3) On the one hand, UMHexagonS adopts a fast search method that reduces search blocks, and on the other hand, it uses search prediction to end the search in advance, and therefore its calculation amount can be reduced by more than 90% compared with the full search method, and at the same time, it can achieve better rate distortion optimization and its performance approaches that of the full search method.

In MV search for video coding, the motion estimation performance evaluation is based on the rate distortion criterion, using the following cost function:

$$J(\vec{mv}, \lambda_{MOTION}) = SAD(s, c(\vec{mv})) + \lambda_{MOTION} \times R(\vec{mv} - \vec{pmv}), \text{ abbreviated as formula (1)}.$$

$\lambda_{MOTION}$ in formula (1) is a Lagrangian multiplier, and when using the Sum of Absolute Difference (SAD) as the distortion measure, its value is:

$$\lambda_{MOTION} = \sqrt{0.85 \times 2^{\frac{QP-12}{3}}}, \text{ abbreviated as formula(2)}.$$

$\vec{mv} = (mv_x, mv_y)^T$ is a candidate motion vector, $\vec{pmv} = (pmv_x, pmv_y)^T$ is a median predictive vector of the current block. $R(\vec{mv} - \vec{pmv})$ represents the number of bits required for differential coding of the motion vector, and QP is a quantization parameter.

The calculation of SAD in formula (1) is as follows:

$$SAD(s, c(\vec{mv})) = \Sigma_{x=1, y=z}^{B_x, B_y} |s[x,y] - c[x - mv_x, i - mv_y]|, \text{ abbreviated as formula (1)}.$$

In formula (3), s is a pixel of the current image to be coded, c is a pixel of a reference image in motion estimation. $B_x$ and $B_y$ represent ranges of the macroblock in the horizontal direction (x-axis) and vertical direction (y-axis), and values of Bx and By in formula (3) can be 16, 8, or 4.

Figure 2:
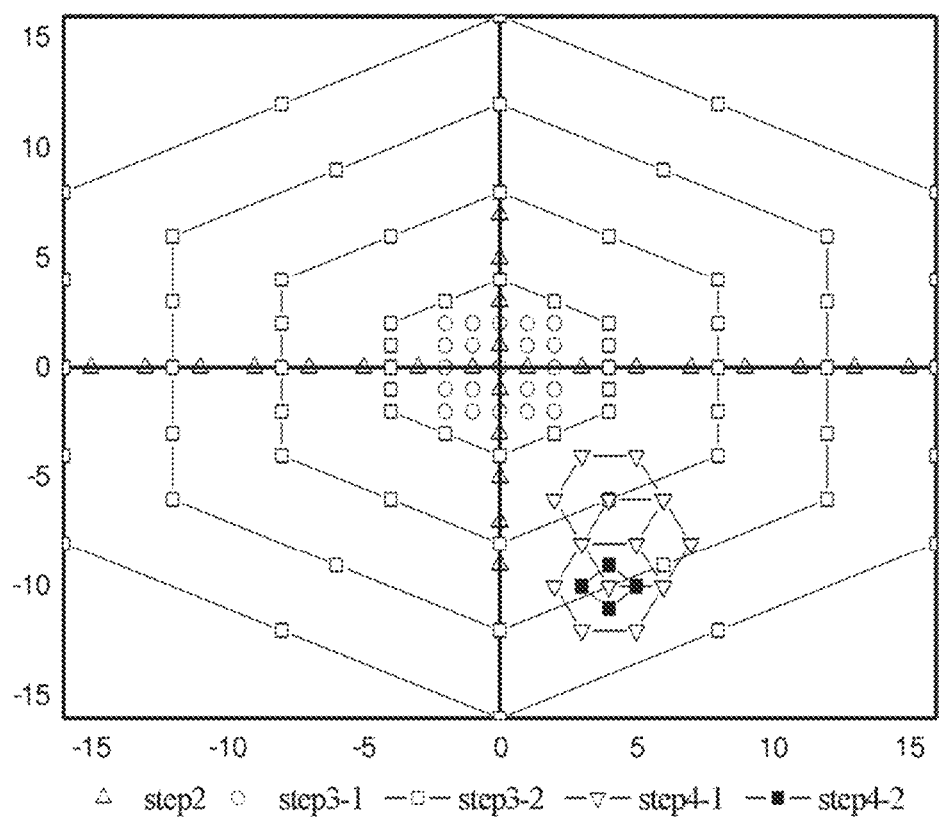
FIG. 2 is a schematic diagram of an application scenario of a UMHexagonS algorithm.
Figure 3:
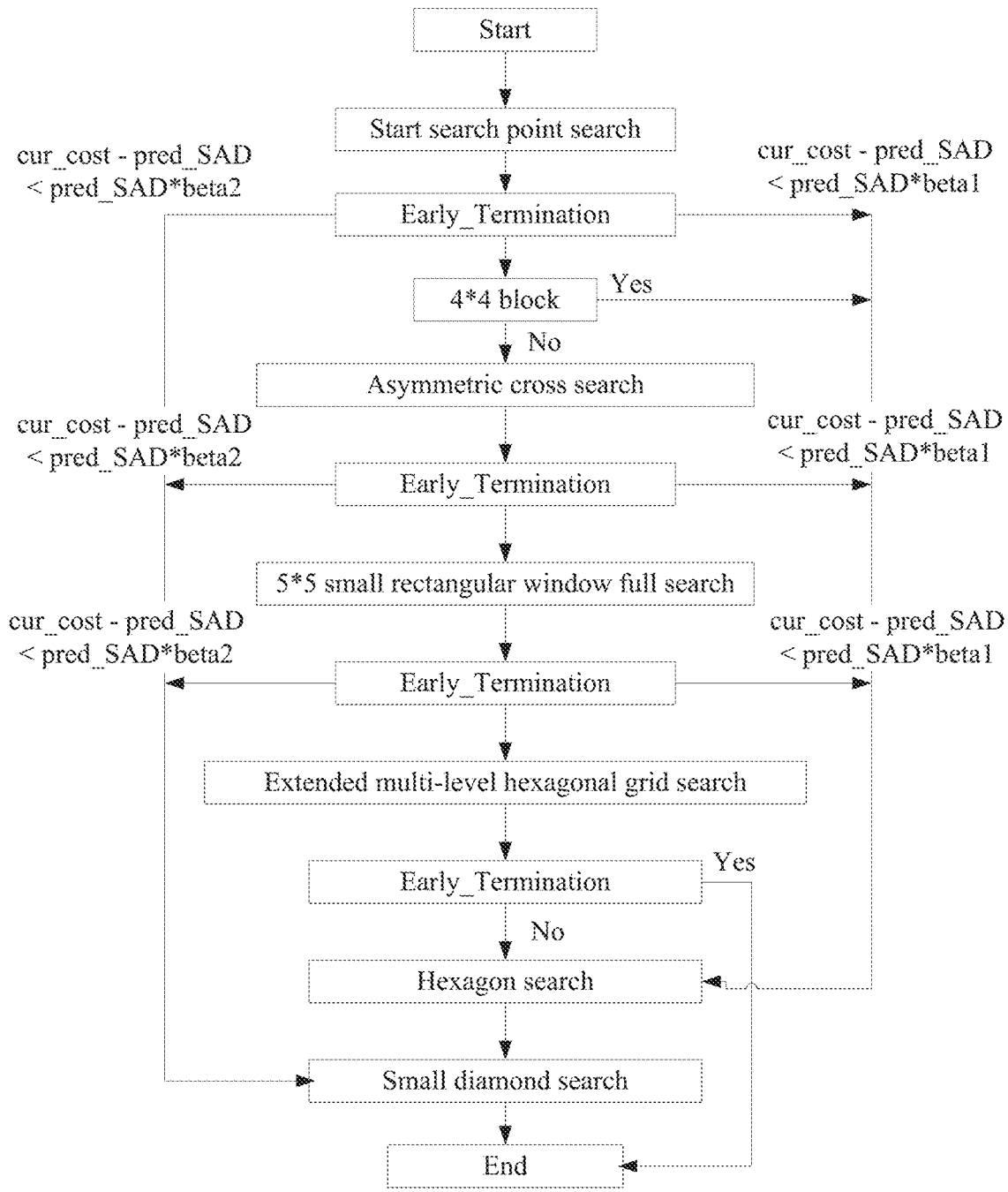
FIG. 3 is a flowchart of a UMHexagonS algorithm.

Referring to FIG. 2 and FIG. 3, the UMHexagonS algorithm includes four different search modes: step1 start search point search; step2 asymmetrical cross search, step3 non-uniform multi-level hexagonal grid search: step4 extended hexagonal search. FIG. 2 is a schematic diagram of the search process within a search window with a search range of W=16 (assuming that the start search point is (0, 0)). FIG. 3 is a flowchart of UMHexagonS search, where cur_cost is the cost value calculated by formula (1), pred_SAD is the predicted value of the cost value of the best matching block for the current block and is from the previously coded adjacent block, and beta1 and beta2 are threshold coefficients and are determined by sizes of the current QP and the current block.

Assuming that the search range is W, combined with the flowchart shown in FIG. 3, the UMHexagonS search steps are as follows:

Step1: Search for the start search point, and determine the current best start search point.

(a). Median prediction: spatial correlation is used to obtain the median $MV_{pred\_MP}$ of motion vectors of adjacent blocks on the left, upper part, and upper right part of the current block.

(b). Origin prediction: considering the static or fixed background, $MV_{pred} = (0,0)$.

(c). Upper layer prediction: the characteristic of multi-macroblock division in motion estimation is used to obtain a calculated motion vector $MV_{pred\_UP}$ of a block at the same position of the upper layer and twice the block size.

(d). Corresponding block prediction: time correlation is used to obtain the calculated motion vector $MV_{pred\_CP}$ at a same position in a previous frame.

(e). Adjacent reference frame prediction: time correlation is used, and the calculated MV of the current block in the previous reference frame is obtained and adjusted proportionally to obtain the current $MV_{pred\_REF}$.

The prediction MV obtained by the above prediction modes is combined into a prediction vector set S, and then a candidate motion vector corresponding to the minimum cost function is found from the set S as the start search point:

$$m_{min} = \arg[m_i^{min} = J(m_i, \lambda_{MOTION})], \text{ abbreviated as formula (4), where } m_i \in S.$$

arg represents a variable value when the target function J is the minimum value.

Then, the early termination (Early_Termination) determination operation is performed according to the cost value of the current best prediction start point, to determine whether to terminate early. A good start prediction point (that is, close to the optimal position, corresponding to a small cost value) will speed up the search process; otherwise, a large number of candidate points will be searched, resulting in an increase in the complexity of the coder.

Further, after determining that early termination is not performed, the size of the macroblock is determined. If the macroblock size of the current motion estimation is 4×4, directly perform step4-1: hexagonal search; or if the macroblock size of the current motion estimation is not equal to 4×4 (for example, other sizes such as 16×16, 8×8, 8×16), step 2 needs to be performed according to the process: asymmetrical cross search.

Step2: Asymmetric cross search. Since the horizontal movement of natural objects is more violent in the horizontal direction than that in the vertical direction, the asymmetrical cross search method is adopted. The so-called asymmetric means that within the cross search range centered on the search start point, the horizontal direction is twice as large as the vertical direction. The candidate motion vector set $\Omega_1$ in this step is:

$$\Omega_1 = \{m=(m_x, m_y) | m=(cm_x \pm 2i, cm_y), i=0, 1, 2, \ldots W/2; m=(cm_x, cm_y \pm 2j), j=0, 1, 2, \ldots W/4\}$$
abbreviated as formula (5).

cm in formula (5) is the best prediction start point obtained in step1, namely, $cm=m_{min}$.

A motion vector with the smallest cost function is found from $\Omega_1$ as the current best motion vector, namely:

$$m_{min2} = \arg[_{m_i}{}^{min} = J(m_i, \lambda_{MOTION})], \text{ abbreviated as formula (4), where } m_i \in \Omega_1.$$

Then, the early termination operation is performed according to the cost value of the current best motion vector, to determine whether to terminate early.

Step3: Non-uniform multi-level hexagonal grid search. This step is divided into two sub-steps:

Step3-1: 5×5 small rectangular window full search.

It should be noted that the size of the rectangular window can be determined by the search range of the macroblock. For example, FIG. 2 shows a 16×16 macroblock, then a 5×5 rectangular window can be selected, and if the search range of the macro block changes, the size of the rectangular window can also be adaptively changed.

In this step, the candidate motion vector set $\Omega_2$ is:

$$\Omega_2 = \{m=(m_x, m_y) | |cm_x - m_x| \leq 2, |cm_y - m_y| \leq 2\},$$
$cm = m_{min2}$, abbreviated as formula (7).

A motion vector with the smallest cost function is found from $\Omega_2$ as the current best motion vector, namely:

$$m_{min3} = \arg[_{m_i}{}^{min} = J(m_i, \lambda_{MOTION})], \text{ abbreviated as formula (8), where } m_i \in \Omega_2.$$

Then, the early termination operation is performed according to the cost value of the current best motion vector, to determine whether to terminate early.

Step3-2: Extended multi-level hexagonal grid search.

The 16 search points (corresponding to the 16×16 macroblock shown in FIG. 2) in the super-hexagonal template used in the search in this step are:

$$Q_{16-HP} = \{m=(x,y) | m=(\pm 4, \pm 2), (\pm 4, \pm 1), (\pm 4, 0), (\pm 2, \pm 3), (0, \pm 4)\} \text{ abbreviated as formula (9).}$$

Expand the search area in the following manner:

```
for (k=0, k<W/4, k++)
{
Π_k = {m = (m_x, m_y)|m_x = cm_x + kx', m_y = cm_y + ky', (m_y, m_y) ∈ Ω_{16-HP}}, cm = m_{min3};
}
```

A motion vector with the smallest cost function is found from $\Pi_k$ as the current best motion vector, namely:

$$m_{min4} = \arg[_{m_i}{}^{min} = J(m_i, \lambda_{MOTION})], \text{ abbreviated as formula (10), where } m_i \in \Pi_k;$$

Then, the early termination operation is performed according to the cost value of the current best motion vector, to determine whether to terminate early.

Step4: Expand the hexagonal search. This step is divided into two sub-steps:

Step4-1: Hexagon search.

The candidate motion vector set $\Omega_3$ in this step is:

$$Q_3 = \{m=(m_x, m_y) | m=(cm_x \pm 2, cm_y), (cm_x \pm 1, cm_y \pm 2)\},$$
$cm = m_{min4}$, abbreviated as formula (11).

A motion vector with the smallest cost function is found from $\Omega_3$ as the current best motion vector, namely:

$$m_{min5} = \arg[_{m_i}{}^{min} = J(m_i, \lambda_{MOTION})], \text{ abbreviated as formula (12), where } m_i \in \Omega_3.$$

The above steps are repeated continuously, that is, the hexagon template is used to search repeatedly until the best prediction point is at the midpoint of the hexagon.

Step4-2: Small diamond search.

The candidate motion vector set $\Omega_4$ in this step is:

$$Q_4 = \{m=(m_x, m_y) | m=(cm_x \pm 1, cm_y), (cm_x, cm_y \pm 1)\},$$
$cm = m_{min5}$, abbreviated as formula (13).

A motion vector with the smallest cost function is found as the current best motion vector, namely:

$$m_{min6} = \arg[_{m_i}{}^{min} = J(m_i, \lambda_{MOTION})], \text{ abbreviated as formula (12), where } m_i \in \Omega_4.$$

The above steps are repeated continuously, that is, the small diamond template is used to search repeatedly, until the best prediction point is at the midpoint of the small diamond, and the final motion vector is obtained.

The motion estimation method provided by the embodiment of the present application will be described in detail below through specific embodiments and application scenarios in conjunction with the accompanying drawings.

Figure 4:
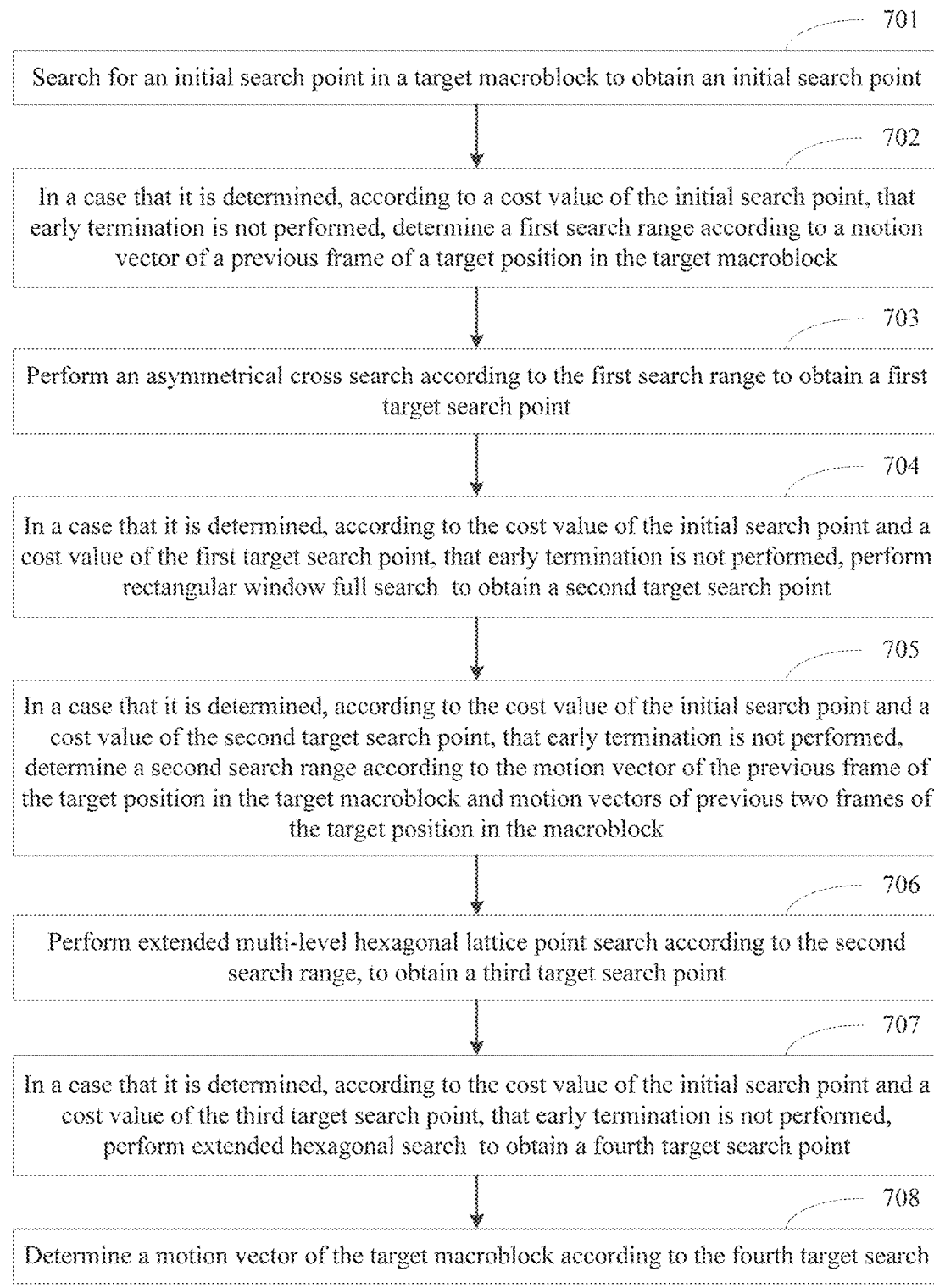
FIG. 4 is a flowchart of a motion estimation method provided by an embodiment of the present application.

Referring to FIG. 4, the embodiment of the present application provides a motion estimation method, and this method is performed by an electronic device. It should be noted that, the method of the embodiment of the present application further improves and optimizes the UMHexagonS algorithm process, and the method includes the following steps:

Step 401: Search for a start search point in a target macroblock to obtain a start search point.

In the embodiment of the present application, the target macroblock refers to a macroblock currently undergoing motion estimation, and the size of the macroblock can be 16×16, 8×8, 8×16. etc., which is not specifically limited in the embodiment of the present application.

For the method of searching for the start search point, refer to the specific process of step 1 in the UMHexagonS algorithm.

Step 402: In a case that it is determined, according to a cost value of the start search point, that early termination is not performed, determine a first search range according to a motion vector of a previous frame of a target position in the target macroblock.

Step 403: Perform an asymmetrical cross search according to the first search range to obtain a first target search point.

In the embodiment of this application, the cost value of the start search point is calculated through the cost function (formula (1)), and then early termination determination is performed according to the cost value of the start search point. For a specific determination method, refer to the early termination determination operation in the UMHexagonS algorithm.

In some implementations, after determining that early termination is not performed. the size of the macroblock is determined. If the macroblock size of the current motion estimation is 4×4, directly perform step4-1 in the UMHexagonS algorithm: hexagonal search; or if the macroblock size of the current motion estimation is not equal to 4×4 (for example, other sizes such as 16×16, 8×8, 8×16), step 2 in the UMHexagonS algorithm needs to be performed according to the process: asymmetrical cross search.

In the embodiment of the present application, in a case that it is determined that early termination is not performed, the first search range is determined according to a motion vector of a previous frame of a target position in the target macroblock.

The existing asymmetrical cross search is based on the assumption that the motion amplitude in the horizontal direction in the video sequence is much larger than that in the vertical direction, and the search range in the horizontal direction is set to 2 times that in the vertical direction. This method may lead to a "local optimum" problem. In actual complex and changeable video sequences, this assumption is not necessarily true. For some video sequences. there are also violent movements in the vertical direction, and the original search method may obtain suboptimal results.

Based on the above reasons, in the embodiment of the present application, search lengths of the current frame asymmetrical cross search in the horizontal and vertical directions are dynamically set according to the MV of a frame at the same position of the macroblock.

The motion vector of the previous frame of the target position in the target macroblock is $MV_{pred\_CP}$; and
the determining a first search range according to a motion vector of a previous frame of a target position in the target macroblock includes:
determining a horizontal search length and a vertical search length based on the following formulas:

$MV_{pred\_CP} = (MV_{pred\_CP\_h}, MV_{pred\_CP\_v})$;

if $(MV_{pred\_CP\_h} \leq m \times MV_{pred\_CP\_v})$, $m \geq 1.5$;

rangeX=W/2, rangeY=W/4;

else if $(MV_{pred\_CP\_h} \leq n \times MV_{pred\_CP\_v})$, $n \geq 1.5$;

rangeX=W/4, rangeY=W/2; and else rangeX=W/2, rangeY=W/2;

where W is a preset search range of the target macroblock, $MV_{pred\_CP\_h}$ is a component of $MV_{pred\_CP}$ in the horizontal direction, $MV_{pred\_CP\_v}$ is a component of $MV_{pred\_CP}$ in the vertical direction, rangeX is the horizontal search length, and rangeY is the vertical search length.

RangeX and rangeY are determined through the above process, and then the formula (5) is used to calculate the candidate motion vector set $\Omega_1$, where in the formula (5), the value range of i depends on rangeX, and the value range of j depends on rangeY.

After the asymmetrical cross search, a new search point can be obtained, which is the first target search point.

Step 404: In a case that it is determined, according to the cost value of the start search point and a cost value of the first target search point, that early termination is not performed, perform rectangular window full search to obtain a second target search point.

Step 405: In a case that it is determined, according to the cost value of the start search point and a cost value of the second target search point, that early termination is not performed, determine a second search range according to the motion vector of the previous frame of the target position in the target macroblock and a motion vector of previous two frames of the target position in the macroblock.

In the embodiment of this application, when early termination determination is performed according to the cost value of the start search point and the cost value of the first target search point, for a specific determination method, refer to the early termination determination operation in the UMHexagonS algorithm.

After determining that early termination is not performed, full search of the rectangular window is performed, such as full search of the 5×5 small rectangular window in the UMHexagonS algorithm, to obtain the second target search point, and then according to the cost value of the start search point and the cost value of the second target search point, the early termination determination is performed, and for the specific determination method, refer to the early termination determination operation in the UMHexagonS algorithm above.

After it is determined that early termination is not performed, the second search range is determined according to the motion vector of the previous frame of the target position in the target macroblock and a motion vector of previous two frames of the target position in the macroblock.

In the existing UMHexagonS algorithm, it is determined after the full search of the rectangular window that early termination is not performed, the extended multi-level hexagonal grid search is performed. The search range of the existing extended multi-level hexagonal grid search is for all search points in the complete super-hexagonal template in the macroblock, and there are many search points that require calculation of cost values.

In the embodiment of this application, when it is determined after the full search of the rectangular window that early termination is not performed, firstly, according to the motion vector of the previous frame and the motion vector of the previous two frames at the same position in the target macroblock, the search range of the extended multi-level hexagonal grid search is determined, that is, the second search range, to further narrow the search range within the complete super-hexagon template in the macroblock In some embodiments, assuming that the current coding frame is t, the motion vector of the current frame of the target position in the target macroblock is $MV_{current\_t}$, the motion vector of the previous frame of the target position in the target macroblock is $MV_{current\_t-1}$.

and the motion vector of the previous two frames of the target position in the target macroblock is $MV_{current\_t-2}$.

The determining the second search range according to the motion vector of the previous frame of the target position in the target macroblock and a motion vector of previous two frames of the target position in the macroblock includes:

When any one of $MV_{current\_t}$, $MV_{current\_t-1}$, or $MV_{current\_t-2}$ is 0), according to the extended multi-level hexagonal grid search of the original method of UMHexagonS is executed, that is, continue to execute according to step3-2.

In a case that $MV_{current\_t}$, $MV_{current\_t-1}$ and $MV_{current\_t-2}$ are not 0, determining an angle $\alpha_1$ between $MV_{current\_t-1}$ and $MV_{current\_t-2}$ by the following formula:

$\alpha_1 = \arccos(\text{dot}(MV_{current_t-2}, MV_{current\_t-1}))$;

Determining an angle $\alpha_2$ between $MV_{current\_t}$ and $MV_{current\_t-1}$ by the following formula:

$\alpha_2 = \arccos(\text{dot}(MV_{current_t-1}, MV_{current\_t}))$;

In the case of $|\alpha_1-\alpha_2|>a$, according to the extended multi-level hexagonal grid search of the original method of UMHexagonS is executed, that is, continue to execute according to step3-2.

In the case of $|\alpha_1-\alpha_2|\leq a$, the second search range is determined according to the angle $\alpha_2$.

The value range of a is $[\pi/10, \pi/4]$, for example, $a=\pi/4$.

In some embodiments, according to the angle range contained in the angle $\alpha_2$, the second search range corresponding to the angle range is determined as follows:

in a case that $\alpha_2$ is within $(0, \pi/2)$, determine that the second search range is all search points within the first quadrant of the target macroblock:

in a case that $\alpha_2$ is within $(\pi/2, \pi)$, determine that the second search range is all search points within the second quadrant of the target macroblock;

in a case that $\alpha_2$ is within $(\pi 3\pi/2]$, determine that the second search range is all search points within the third quadrant of the target macroblock; and in a case that $\alpha_2$ is within $(3\pi/2, 2\pi]$, determining that the second search range is all search points in the fourth quadrant of the target macroblock.

Figure 5A:
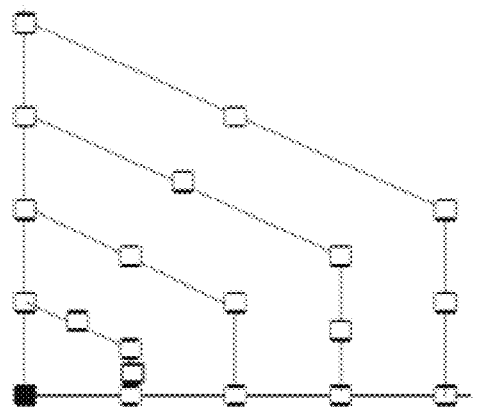
FIG. 5a-FIG. 5d are schematic diagram 1 of an application scenario provided by an embodiment of the present application.
Figure 5B:
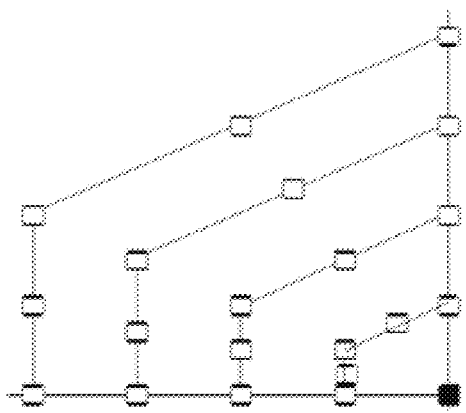
Figure 5C:
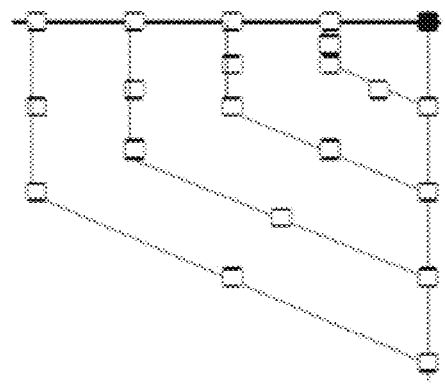
Figure 5D:
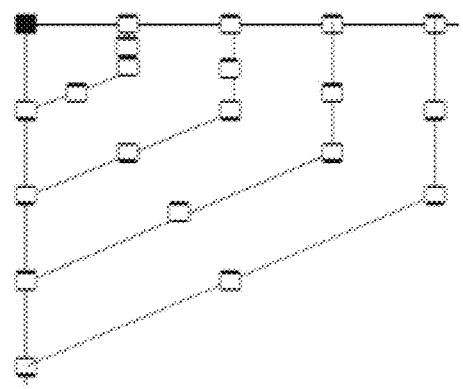

Refer to FIGS. 5a-FIG. 5d for details, which show the mode of the second search range when $\alpha_2$ is in different cases:

in a case that $\alpha_2$ is within $(0, \pi/2)$, the second search range is shown in FIG. 5a:

in a case that $\alpha_2$ is within $(\pi/2, \pi)$, the second search range is shown in FIG. 5b:

in a case that az is within $(\pi, 3\pi/2)$, the second search range is shown in FIG. 5c: and in a case that $\alpha_2$ is within $(3\pi/2, 2\pi)$, the second search range is shown in FIG. 5d.

In the UMHexagonS algorithm, FIG. 2 and FIGS. 5a-FIG. 5d are compared, and in the search diagram shown in FIG. 2 (the start search point is (0,0), and the search range is W=16), the total pixels searched in step3-2 is 4× 16=64. Using the method of the embodiment of this application. as long as one of FIGS. 5a-FIG. 5b is calculated, the search can be completed. and the number of search points after optimization is reduced to 4×5=20, and compared with the 64 points of the original method, it is reduced by 63.69%.

Step 406: Perform extended multi-level hexagonal grid search according to the second search range, to obtain a third target search point.

Step 407: In a case that it is determined, according to the cost value of the start search point and a cost value of the third target search point, that early termination is not performed, perform extended hexagonal search to obtain a fourth target search point.

Step 408: Determine a motion vector of the target macroblock according to the fourth target search point.

In the embodiment of this application, after performing the extended multi-level hexagonal grid search, the third target search point is obtained; then early termination determination is performed according to the cost value of the start search point and the cost value of the third target search point, and for a specific determination method, refer to the early termination determination operation in the UMHexagonS algorithm.

After determining that early termination is not performed, step4 in the existing UMHexagonS algorithm is performed: extend the hexagon search, and determine the final search point after the search, that is, the fourth target search point, and then obtain the final motion vector based on the fourth target search point, that is, the motion estimation result for the target macroblock.

In the embodiment of this application, for the existing UMHexagonS algorithm, the determination of the search ranges of the asymmetrical cross search and the extended multi-level hexagonal grid search is optimized, more sophisticated prediction mechanism and search module are adopted, there is dynamic self-adaptability, and it can determine the optimal matching block and optimal motion vector more accurately and quickly, avoid searching for prematurely entering local optimal dead end and greatly reduce the computational complexity and coding time, and improve the efficiency and effectiveness of video coders.

Referring to FIG. 6a to FIG. 6d, an application example of the method of the embodiment of the present application is described in conjunction with the accompanying drawings:

The example in this section codes a Quarter Common Intermediate Format (QCIF) video sequence (176×144), and one frame of image contains 99 macroblocks of 16×16 size.

When coding, except for the first frame, all other frames are P frames, that is, the method of IPPP . . . is used (note: in video coding, the I frame identifies the key frame, and the P frame represents the difference between this frame and the previous key frame (or P frame)), a frame coding mode (note: if field coding mode is used, the relevant configuration parameters need to be multiplied by 2) is used, the frame rate is 24 frames per second, motion estimation search range is W=16, the number of reference frames is set to 1, the rate distortion optimization coding is started, and the quantization parameter QP-28. Assume that the current coding block is a block with a size of 16×16 in a P frame image.

Figure 6A:
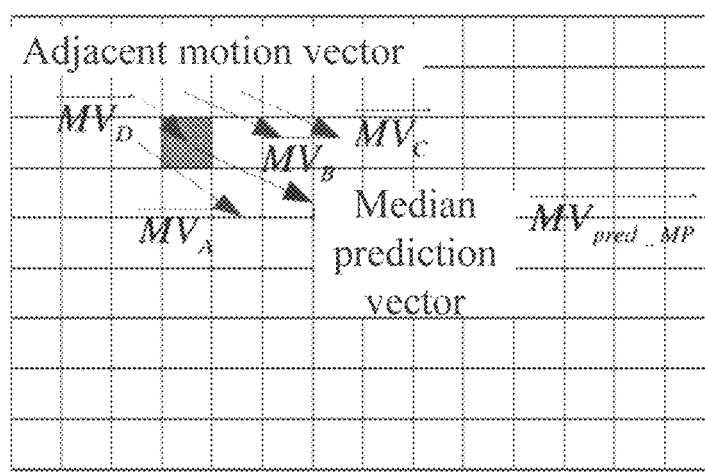
FIG. 6a is a schematic diagram 2 of an application scenario provided by an embodiment of the present application.

Step1. Start search point search.
(a). Median prediction: the median prediction $MV_{pred\_MP}$ is calculated, the calculation process is shown in FIG. 6a, the median prediction motion vector $MV_{pred\_MP}$=median ($MV_A$, $MV_B$, $MV_C$), and the median( ) function performs the function of obtaining the median value.

It is set that E is the current block, A is on the left side of E, B is above E, and C is on the upper right of E. If there is more than one block on the left side of E, the topmost block is selected as A, and the leftmost block is selected above E as B. In the process of predicting E, the following guidelines are observed at the same time:

(1). Except for blocks with a block size of 16×8 and 8×16, the predicted value is the median value of the motion vectors of blocks A, B, and C.

(2). For the 16×8 block, the predicted value of the upper 16×8 block is predicted according to B, and the predicted value of lower 16×8 is obtained according to A.

(3). For the 8×16 block, the predicted value of the 8×16 block on the left is predicted according to A, and the predicted value of the 8×16 block on the right is obtained according to C.

(c). Upper layer prediction: upper layer prediction MVpred_upis calculated.

Figure 6B:
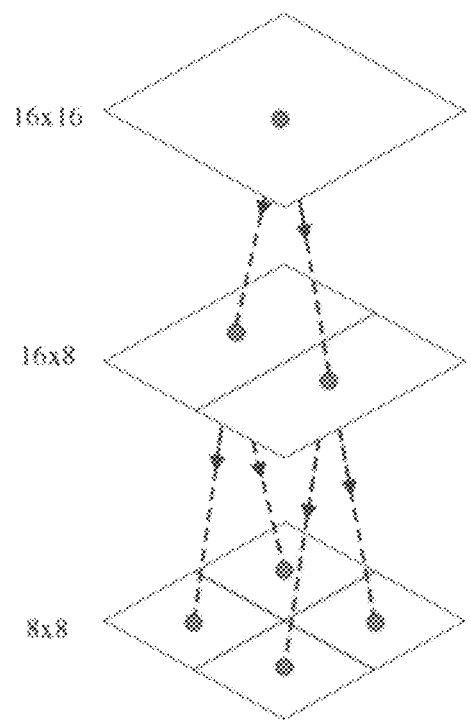
FIG. 6b is a schematic diagram 3 of an application scenario provided by an embodiment of the present application.

The motion vector estimation adopts the top-down upper layer motion vector prediction, as shown in FIG. 6b. If the motion vector of a 16×16 block has been obtained, it is used to predict two sub-blocks (16×8 and 8×16); and a motion vector of a 16×8 (8×16) block can be used for predicting two 8×8 subblocks at the same location, etc.

Since the current coding block size is 16×16, there is no upper layer prediction $MV_{pred\_UP}$.

Figure 6C:
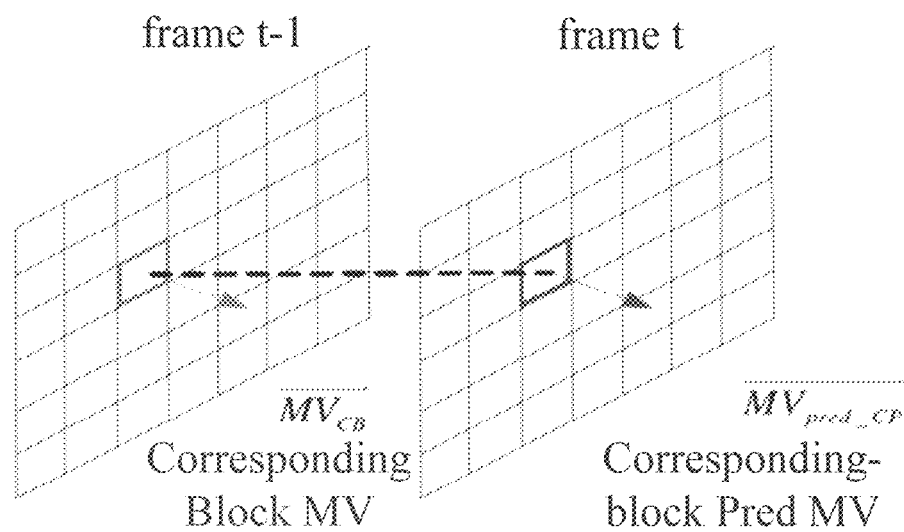
FIG. 6c is a schematic diagram 4 of an application scenario provided by an embodiment of the present application.
Figure 6D:
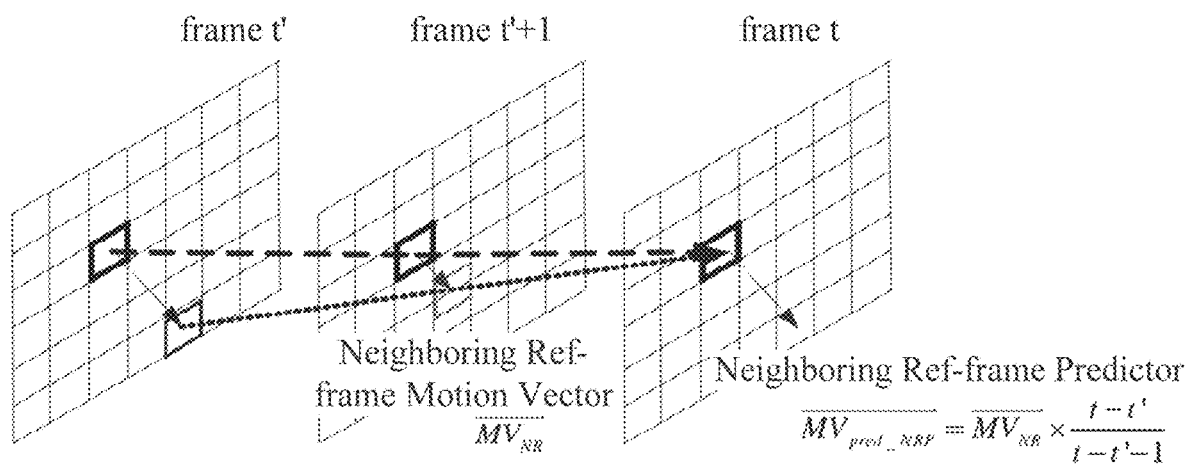
FIG. 6d is a schematic diagram 5 of an application scenario provided by an embodiment of the present application.

(d). Corresponding block prediction: time correlation is used to obtain the calculated motion vector MVpred cp at a same position in a previous frame. This prediction method is very effective in the smooth motion area and the large overall motion area, and its principle diagram is shown in FIG. 6c:

(e). Adjacent reference frame prediction: motion estimation using multiple reference frames can support up to 15 reference frames, and the principle is shown in FIG. 6d.

Figure 8:
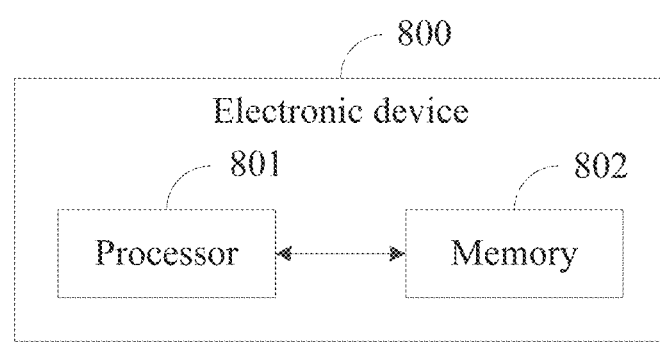
FIG. 8 is a schematic structural diagram 1 of an electronic device provided by an embodiment of this application.

In FIG. 8, assuming that the time of the frame where the current block is located is t, when searching for the best matching block of the current block in the previous reference frame t', the motion vector of the current block in the reference frame t'+1 can be used to estimate the motion vector of the current block in frame t', namely:

$$MV_{pred\_NRP} = MV_{NR} \times \frac{t-t'}{t-t'-1};$$

In this example, since the number of reference frames is set to 1, there is no adjacent reference frame prediction $MV_{pred\_NRP}$.

Combined with the above analysis, in this example, the prediction vector set S in this step includes the following vectors:

S={median prediction: $MV_{pred\_MP}$; origin prediction: $MV_{pred}$; corresponding block prediction: $MV_{pred\_CP}$}.

The cost function of each prediction vector is calculated according to formula (1). and the corresponding point of the prediction vector with the lowest cost value is selected as the start search point. Beta1=0.1 and beta1=0.4 are selected as thresholds for the early termination operation.

Step2: Asymmetric cross search.

This step uses the method in the embodiment of the present application, search lengths of the current frame asymmetrical cross search in the horizontal and vertical directions are dynamically set according to the MV of a frame at the same position of the macroblock.

Refer to the steps in FIG. 4. In the implementation, W=16.

Step3: Non-uniform multi-level hexagonal grid search.

Step3-1: 5×5 small rectangular window full search, and this step uses the original method of UMHexagonS.

Step3-2: this step uses the improved extended multi-level hexagonal grid search method proposed by this patent.

Step4: Extended hexagonal search.

Step4-1: Hexagon search, and this step uses the original method of UMHexagonS.

Step4-2: Small diamond search, and this step uses the original method of UMHexagonS.

Figure 7:
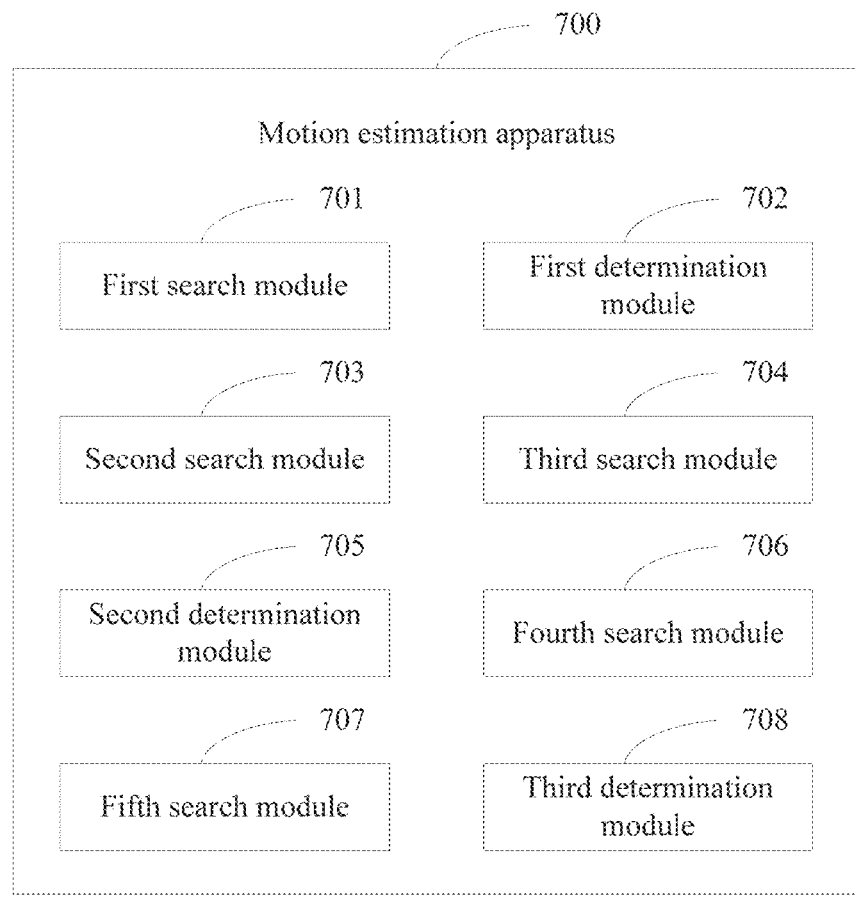
FIG. 7 is a schematic structural diagram of a motion estimation apparatus provided by an embodiment of the present application.

Referring to FIG. 7, the embodiment of the present application provides a motion estimation apparatus 700, the apparatus is applied to an electronic device, and the apparatus includes:

a first search module 701, configured to search for a start search point in a target macroblock to obtain a start search point;

a first determination module 702, configured to: in a case that it is determined, according to a cost value of the start search point, that early termination is not performed. determine a first search range according to a motion vector of a previous frame of a target position in the target macroblock:

a second search module 703, configured to perform an asymmetrical cross search according to the first search range to obtain a first target search point;

a third search module 704, configured to: in a case that it is determined, according to the cost value of the start search point and a cost value of the first target search point, that early termination is not performed, perform rectangular window full search to obtain a second target search point;

a second determination module 705, configured to: in a case that it is determined, according to the cost value of the start search point and a cost value of the second target search point, that early termination is not performed, determine a second search range according to the motion vector of the previous frame of the target position in the target macroblock and a motion vector of previous two frames of the target position in the macroblock;

a fourth search module 706, configured to perform extended multi-level hexagonal grid search according to the second search range, to obtain a third target search point;

a fifth search module 707, configured to: in a case that it is determined, according to the cost value of the start search point and a cost value of the third target search point, that early termination is not performed, perform extended hexagonal search to obtain a fourth target search point; and a third determination module 708, configured to determine a motion vector of the target macroblock according to the fourth target search point.

In some embodiments, the motion vector of the previous frame of the target position in the target macroblock is $MV_{pred\_CP}$;

The first determination module is further configured to:

determining a horizontal search length and a vertical search length based on the following formulas:

$MV_{pred\_CP} = (MV_{pred\_CP\_h}, MV_{pred\_CP\_v})$;

if $(MV_{pred\_CP\_h} \leq m \times MV_{pred\_CP\_v})$, $m \geq 1.5$;

rangeX=W/2, rangeY=W/4;

else if $(MV_{pred\_CP\_h} \leq n \times MV_{pred\_CP\_v})$, $m \geq 1.5$;

rangeX=W/4, rangeY=W/2; and else rangeX=W/2, rangeY=W/2;

where W is a preset search range of the target macroblock, $MV_{pred\_CP\_h}$ is a component of $MV_{pred\_CP}$ in the horizontal direction, $MV_{pred\_CP\_v}$ a component of $MV_{pred\_CP}$ in the vertical direction, rangeX is the horizontal search length, and rangeY is the vertical search length.

In some embodiments, the motion vector of the current frame of the target position in the target macroblock is $MV_{current\_t}$, the motion vector of the previous frame of the target position in the target macroblock is $MV_{current\_t-1}$, and the motion vector of the previous two frames of the target position in the target macroblock is $MV_{current\_t-2}$.

The second determination module is further configured to:

in a case that $MV_{current\_t}$, $MV_{current\_t-1}$ and $MV_{current\_t-2}$ are not 0, determine an angle $\alpha_1$ between $MV_{current\_t-1}$ and $MV_{current\_t-2}$ by the following formula:

$\alpha_2$=arccos (dot($MV_{current\_t-2}$, $MV_{current\_t-1}$));

determine an angle $\alpha_2$ between $MV_{current\_t}$ and $MV_{current\_t-1}$ by the following formula:

$\alpha_2$=arccos (dot($MV_{current\_t-1}$, $MV_{current\_t}$));

in the case of $|\alpha_1-\alpha_2|\leq a$, determine the second search range according to the angle $\alpha_2$, where a value range of a is $[\pi/10, \pi/4]$.

In some implementations, the second determination module is further configured to:
in a case that $\alpha_2$ is within $(0, \pi/2)$, determine that the second search range is all search points within the first quadrant of the target macroblock:
in a case that $\alpha_2$ is within $(\pi/2, \pi)$, determine that the second search range is all search points within the second quadrant of the target macroblock;
in a case that $\alpha_2$ is within $(\pi, 3\pi/2]$, determine that the second search range is all search points within the third quadrant of the target macroblock: and
in a case that $\alpha_2$ is within $(3\pi/2, 2\pi]$, determine that the second search range is all search points in the fourth quadrant of the target macroblock.

It should be noted that, the motion estimation method provided by the embodiment of the present application may be executed by a motion estimation apparatus, or a control module in the motion estimation apparatus for executing the motion estimation method. In the embodiment of the present application, the motion estimation method performed by the motion estimation device is taken as an example to illustrate the motion estimation apparatus provided in the embodiment of the present application The motion estimation apparatus in the embodiment of the present application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, a personal digital assistant (PDA), or the like. The non-mobile electronic device may be a server, a Network Attached Storage (NAS), a personal computer (PC), a television (TV), a teller machine, a self-service machine, or the like. This is not specifically limited in the embodiments of this application.

The motion estimation apparatus in the embodiment of the present application may be an apparatus with an operating system. The operating system may be an Android operating system, may be an iOS operating system, or may be another possible operating system. This is not specifically limited in this embodiment of this application.

The motion estimation apparatus provided in this embodiment of the present application can implement each process in the method embodiments of FIG. 4. To avoid repetition, details are not described herein again.

As shown in FIG. 8, the embodiment of the present application further provides an electronic device 800, including a memory 801, a processor 802, and programs or instructions stored in the memory 801 and operable on the processor 802, When the program or instruction is executed by the processor 802, each process of the above-mentioned motion estimation method embodiment can be realized, and the same technical effect can be achieved. To avoid repetition, details are not repeated here.

It should be noted that the electronic device in the embodiments of the present application include mobile electronic devices and non-mobile electronic devices.

Figure 9:
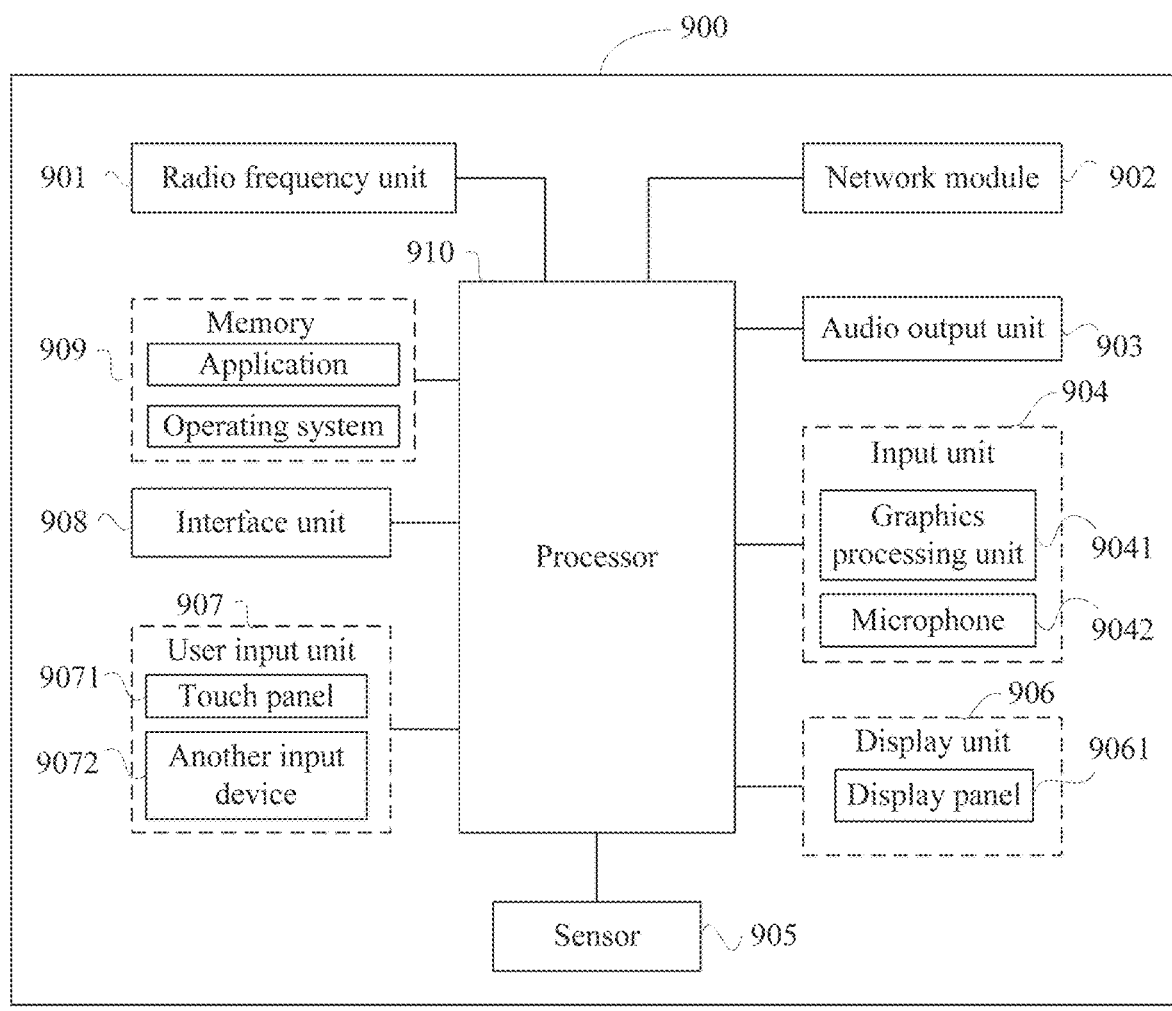
FIG. 9 is a schematic structural diagram 2 of an electronic device provided by an embodiment of this application.

FIG. 9 is a schematic structural diagram of hardware of an electronic device according to an embodiment of this application.

The electronic device 900 includes but is not limited to: components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the electronic device 900 may further include a power supply (for example, a battery) that supplies power to each component. The power supply may be logically connected to the processor 910 by using a power supply management system, to implement functions such as charging and discharging management. and power consumption management by using the power supply management system. The structure of the electronic device shown in FIG. 9 does not constitute a limitation on the electronic device. The electronic device may include more or fewer components than those shown in the diagram. a combination of some components, or different component arrangements. Details are not described herein.

The processor 910 is configured to:
search for a start search point in a target macroblock to obtain a start search point:
in a case that it is determined, according to a cost value of the start search point, that early termination is not performed, determine a first search range according to a motion vector of a previous frame of a target position in the target macroblock;
perform an asymmetrical cross search according to the first search range to obtain a first target search point:
in a case that it is determined, according to the cost value of the start search point and a cost value of the first target search point, that early termination is not performed, perform rectangular window full search to obtain a second target search point;
in a case that it is determined, according to the cost value of the start search point and a cost value of the second target search point, that early termination is not performed, determine a second search range according to the motion vector of the previous frame of the target position in the target macroblock and a motion vector of previous two frames of the target position in the macroblock;
perform extended multi-level hexagonal grid search according to the second search range, to obtain a third target search point:
in a case that it is determined, according to the cost value of the start search point and a cost value of the third target search point, that early termination is not performed, perform extended hexagonal search to obtain a fourth target search point, and determine a motion vector of the target macroblock according to the fourth target search point.

In some embodiments, the motion vector of the previous frame of the target position in the target macroblock is $MV_{pred\_CP}$;

The processor 910 is further configured to:
determine a horizontal search length and a vertical search length based on the following formulas:

$MV_{pred\_CP}=(MV_{pred\_CP\_h}, MV_{pred\_CP\_v})$;

if $(MV_{pred\_CP\_h} \leq m \times MV_{pred\_CP\_v})$, $m \geq 1.5$;

rangeX=W/2, rangeY=W/4;

else if $(MV_{pred\_CP\_h} \leq n \times MV_{pred\_CP\_v})$, $n \geq 1.5$;

rangeX=W/4, rangeY=W/2; and else rangeX=W/2, rangeY=W/2;

where W is a preset search range of the target macroblock, $MV_{pred\_CP\_h}$ is a component of $MV_{pred\_CP}$ in the horizontal direction, $MV_{pred\_CP\_v}$ is a component of $MV_{pred\_CP}$ in the vertical direction, rangeX is the horizontal search length, and rangeY is the vertical search length.

In some embodiments, the motion vector of the current frame of the target position in the target macroblock is $MV_{current\_t}$, the motion vector of the previous frame of the target position in the target macroblock is $MV_{current\_t-1}$, and the motion vector of the previous two frames of the target position in the target macroblock is $MV_{current\_t-2}$.

The processor 910 is further configured to:
in a case that $MV_{current\_t}$, $MV_{current\_t-1}$ and $MV_{current\_t-2}$ are not 0,
determining an angle di between MVcurrent t-1 and MVcurrent t-2 by the following formula:

$\alpha_1 = \arccos(\text{dot}(MV_{current_t-2}, MV_{current\_t-1}))$;

determining an angle $\alpha_2$ between $MV_{current\_t}$ and $MV_{current\_t-1}$ by the following formula:

$\alpha_1 = \arccos(\text{dot}(MV_{current_t-1}, MV_{current\_t}))$;

in the case of $|\alpha_1 - \alpha_2 5 1 \le a$, determining the second search range according to the angle $\alpha_2$, where a value range of a is $[\pi/10, \pi/4]$.

In some embodiments, the processor 910 is further configured to:
in a case that $\alpha_2$ is within $(0, \pi/2)$, determine that the second search range is all search points within the first quadrant of the target macroblock:
in a case that $\alpha_2$ is within $(\pi/2, \pi)$, determine that the second search range is all search points within the second quadrant of the target macroblock:
in a case that $\alpha_2$ is within $(\pi, 3\pi/2]$, determine that the second search range is all search points within the third quadrant of the target macroblock; and
in a case that $\alpha_2$ is within $(3\pi/2, 2\pi]$, determine that the second search range is all search points in the fourth quadrant of the target macroblock.

The embodiment of the present application optimizes the selection of the search range in the motion estimation process of video coding, which can determine the optimal matching block and the optimal motion vector more accurately and quickly, avoiding the search from falling into local optimum, reducing computational complexity and coding time, and improving the efficiency and effectiveness of video coding.

It should be understood that in this embodiment of this application, the input unit 904 may include a Graphics Processing Unit (GPU) 9041 and a microphone 9042. The graphics processing unit 9041 processes image data of a static picture or a video obtained by an image capture apparatus (for example, a camera) in a video capture mode or an image capture mode. The display unit 906 may include a display panel 9061, and the display panel 9061 may be configured in a form of a liquid crystal display, an organic light-emitting diode, and the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

The memory 909 may be configured to store a software program and various pieces of data, including but not limited to an application and an operating system. An application processor and a modem processor may be integrated into the processor 910. The application processor mainly processes an operating system, a user interface, an application. and the like. The modem processor mainly processes wireless communication. It can be understood that, the above modem processor may not be integrated into the processor 910.

An embodiment of the present application further provides a readable storage medium. The readable storage medium stores a program or an instruction, and when the program or the instruction is executed by a processor, the various processes of the foregoing motion estimation method embodiment is performed and the same technical effects can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing motion estimation method and the same technical effects can be achieved. To avoid repetition, details are not described herein again It should be understood that the chip in the embodiments of this application may also be referred to as a system-level chip, a system chip, a chip system, a system on chip, or the like.

An embodiment of the present application further provides a computer program product stored in a nonvolatile storage medium, and the computer program product is executed by at least one processor to implement steps of the foregoing method.

The embodiment of the present application further provides a motion estimation apparatus, and the apparatus is configured to execute the foregoing method.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A method for motion estimation, comprising:

searching for a start search point in a target macroblock to obtain a start search point;

when it is determined, according to a cost value of the start search point, that early termination is not performed, determining a first search range according to a motion vector of a previous frame of a target position in the target macroblock;

performing an asymmetrical cross search according to the first search range to obtain a first target search point;

when it is determined, according to the cost value of the start search point and a cost value of the first target search point, that early termination is not performed, performing rectangular window full search to obtain a second target search point;

when it is determined, according to the cost value of the start search point and a cost value of the second target search point, that early termination is not performed, determining a second search range according to the motion vector of the previous frame of the target position in the target macroblock and a motion vector of previous two frames of the target position in the macroblock;

performing extended multi-level hexagonal grid search according to the second search range, to obtain a third target search point;

when it is determined, according to the cost value of the start search point and a cost value of the third target search point, that early termination is not performed, performing extended hexagonal search to obtain a fourth target search point; and determining a motion vector of the target macroblock according to the fourth target search point.

2. The method according to claim 1, wherein the motion vector of the previous frame of the target position in the target macroblock is $MV_{pred\_CP}$, and determining the first search range according to the motion vector of the previous frame of the target position in the target macroblock comprises:

determining a horizontal search length and a vertical search length based on the following formulas:

$MV_{pred\_CP}=(MV_{pred\_CP\_h}, MV_{pred\_CP\_v})$;

if $(MV_{pred\_CP\_h}, \leq m \times MV_{pred\_CP\_v})$, $m \geq 1.5$;

rangeX=W/2, rangeY=W/4;

else if $(MV_{pred\_CP\_h}, \leq n \times MV_{pred\_CP\_v})$, $n \geq 1.5$;

rangeX=W/4, rangeY=W/2; and else rangeX=W/2, rangeY=W/2;

wherein W is a preset search range of the target macroblock, $MV_{pred\_CP\_h}$ is a component of $MV_{pred\_CP}$ in the horizontal direction, $MV_{pred\_CP\_v}$ is a component of $MV_{pred\_CP}$ in the vertical direction, rangeX is the horizontal search length, and rangeY is the vertical search length.

3. The method according to claim 1, wherein:

the motion vector of the current frame of the target position in the target macroblock is $MV_{current\_t}$, the motion vector of the previous frame of the target position in the target macroblock is $MV_{current\_t-1}$; and the motion vector of the previous two frames of the target position in the target macroblock is $MV_{current\_t-2}$; and determining the second search range according to the motion vector of the previous frame of the target position in the target macroblock and the motion vector of previous two frames of the target position in the macroblock comprises:

when $MV_{current\_t}$, $MV_{current\_t-1}$, and $MV_{current\_t-2}$ are not 0, determining an angle $\alpha_1$ between $MV_{current\_t-1}$ and $MV_{current\_t-2}$ by the following formula:

$\alpha_1 = \arccos(\text{dot}(MV_{currentt-2}, MV_{current\_t-1}))$ ;

determining an angle $\alpha_2$ between $MV_{current\_t}$ and $MV_{current\_t-1}$ by the following formula:

$\alpha_2 = \arccos(\text{dot}(MV_{currentt-1}, MV_{current\_t}))$; and when $|\alpha_1 - \alpha_2| \leq a$, determining the second search range according to the angle $\alpha_2$, wherein a value range of a is $[\pi/10, \pi/4]$.

4. The method according to claim 3, wherein determining the second search range according to the angle $\alpha_2$ comprises:

when $\alpha_2$ is within $(0, \pi/2)$, determining that the second search range is all search points within the first quadrant of the target macroblock;

when $\alpha_2$ is within $(\pi/2, \pi)$, determining that the second search range is all search points within the second quadrant of the target macroblock;

when $\alpha_2$ is within $(\pi, 3\pi/2]$, determining that the second search range is all search points within the third quadrant of the target macroblock; and when $\alpha_2$ is within $(3\pi/2, 2\pi]$, determining that the second search range is all search points in the fourth quadrant of the target macroblock.

5. An electronic device, comprising a memory storing a computer program; and a processor coupled to the memory and configured to execute the computer program to perform operations comprising:

searching for a start search point in a target macroblock to obtain a start search point;

when it is determined, according to a cost value of the start search point, that early termination is not performed, determining a first search range according to a motion vector of a previous frame of a target position in the target macroblock;

performing an asymmetrical cross search according to the first search range to obtain a first target search point;

when it is determined, according to the cost value of the start search point and a cost value of the first target search point, that early termination is not performed, performing rectangular window full search to obtain a second target search point;

when it is determined, according to the cost value of the start search point and a cost value of the second target search point, that early termination is not performed, determining a second search range according to the motion vector of the previous frame of the target position in the target macroblock and a motion vector of previous two frames of the target position in the macroblock;

performing extended multi-level hexagonal grid search according to the second search range, to obtain a third target search point;

when it is determined, according to the cost value of the start search point and a cost value of the third target search point, that early termination is not performed, performing extended hexagonal search to obtain a fourth target search point; and determining a motion vector of the target macroblock according to the fourth target search point.

6. The electronic device according to claim 5, wherein the motion vector of the previous frame of the target position in the target macroblock is MVpred cp, and determining the first search range according to the motion vector of the previous frame of the target position in the target macroblock comprises:

determining a horizontal search length and a vertical search length based on the following formulas:

$MV_{pred\_CP} = (MV_{pred\_CP\_h}, MV_{pred\_CP\_v})$;

if $(MV_{pred\_CP\_h} \leq m \times MV_{pred\_CP\_v})$, $m \geq 1.5$;

rangeX=W/2, rangeY=W/4;

else if $(MV_{pred\_CP\_h} \leq n \times MV_{pred\_CP\_v})$, $n \geq 1.5$;

rangeX=W/4, rangeY=W/2; and else rangeX=W/2, rangeY=W/2;

wherein W is a preset search range of the target macroblock, $MV_{pred\_CP\_h}$ is a component of $MV_{pred\_CP}$ in the horizontal direction, $MV_{pred\_CP\_v}$ is a component of $MV_{pred\_CP}$ in the vertical direction, rangeX is the horizontal search length, and rangeY is the vertical search length.

7. The electronic device according to claim 5, wherein the operations further comprise:

the motion vector of the current frame of the target position in the target macroblock is $MV_{current\_t}$, the motion vector of the previous frame of the target position in the target macroblock is $MV_{current\_t-1}$, and the motion vector of the previous two frames of the target position in the target macroblock is $MV_{current\_t-2}$; and determining the second search range according to the motion vector of the previous frame of the target position in the target macroblock and the motion vector of previous two frames of the target position in the macroblock comprises:

when $MV_{current\_t}$, $MV_{current\_t-1}$, and $MV_{current\_t-2}$ are not 0, determining an angle $\alpha_1$ between $MV_{current\_t-1}$ and $MV_{current\_t-2}$ by the following formula:

$\alpha_1 = \arccos(\text{dot}(MV_{currentt-2}, MV_{current\_t-1}))$;

determining an angle $\alpha_2$ between $MV_{current\_t}$ and $MV_{current\_t-1}$ by the following formula:

$\alpha_2 = \arccos(\text{dot}(MV_{currentt-1}, MV_{current\_t}))$; and when $|\alpha_1 - \alpha_2| \leq a$, determining the second search range according to the angle $\alpha_2$, wherein a value range of a is $[\pi/10, \pi/4]$.

8. The electronic device according to claim 7, wherein determining the second search range according to the angle $\alpha_2$ comprises:

when $\alpha_2$ is within $(0, \pi/2)$, determining that the second search range is all search points within the first quadrant of the target macroblock;

when $\alpha_2$ is within $(\pi/2, \pi)$, determining that the second search range is all search points within the second quadrant of the target macroblock;

when $\alpha_2$ is within $(\pi, 3\pi/2]$, determining that the second search range is all search points within the third quadrant of the target macroblock; and when $\alpha_2$ is within $(3\pi/2, 2\pi]$, determining that the second search range is all search points in the fourth quadrant of the target macroblock.

9. A non-transitory computer-readable storage medium, storing a computer program, wherein the computer program, when executed by a processor, causes the processor to perform operations comprising:

searching for a start search point in a target macroblock to obtain a start search point;

when it is determined, according to a cost value of the start search point, that early termination is not performed, determining a first search range according to a motion vector of a previous frame of a target position in the target macroblock;

performing an asymmetrical cross search according to the first search range to obtain a first target search point;

when it is determined, according to the cost value of the start search point and a cost value of the first target search point, that early termination is not performed, performing rectangular window full search to obtain a second target search point;

when it is determined, according to the cost value of the start search point and a cost value of the second target search point, that early termination is not performed, determining a second search range according to the motion vector of the previous frame of the target position in the target macroblock and a motion vector of previous two frames of the target position in the macroblock;

performing extended multi-level hexagonal grid search according to the second search range, to obtain a third target search point;

when it is determined, according to the cost value of the start search point and a cost value of the third target search point, that early termination is not performed, performing extended hexagonal search to obtain a fourth target search point; and determining a motion vector of the target macroblock according to the fourth target search point.

10. The non-transitory computer-readable storage medium according to claim 9, wherein the motion vector of the previous frame of the target position in the target macroblock is $MV_{pred\_CP}$, and determining the first search range according to the motion vector of the previous frame of the target position in the target macroblock comprises:

determining a horizontal search length and a vertical search length based on the following formulas:

$MV_{pred\_CP} = (MV_{pred\_CP\_h}, MV_{pred\_CP\_v})$;

if $(MV_{pred\_CP\_h} \le m \times MV_{pred\_CP\_v})$, $m \ge 1.5$;

rangeX=W/2, rangeY=W/4;

else if $(MV_{pred\_CP\_h} \le n \times MV_{pred\_CP\_v})$, $n \ge 1.5$;

rangeX=W/4, rangeY=W/2; and else rangeX=W/2, rangeY=W/2;

wherein W is a preset search range of the target macroblock, $MV_{pred\_CP\_h}$ is a component of $MV_{pred\_CP}$ in the horizontal direction, $MV_{pred\_CP\_v}$ is a component of $MV_{pred\_CP}$ in the vertical direction, rangeX is the horizontal search length, and rangeY is the vertical search length.

11. The non-transitory computer-readable storage medium according to claim 9, wherein the operations further comprise:
the motion vector of the current frame of the target position in the target macroblock is $MV_{current\_t}$, the motion vector of the previous frame of the target position in the target macroblock is $MV_{current\_t-1}$, and the motion vector of the previous two frames of the target position in the target macroblock is $MV_{current\_t-2}$; and
determining the second search range according to the motion vector of the previous frame of the target position in the target macroblock and the motion vector of previous two frames of the target position in the macroblock comprises:
when $MV_{current\_t}$, $MV_{current\_t-1}$, and $MV_{current\_t-2}$ are not 0,
determining an angle $\alpha_1$ between $MV_{current\_t-1}$ and $MV_{current\_t-2}$ by the following formula:
$\alpha_1 = \arccos(dot(MV_{current\_t-2}, MV_{current\_t-1}))$;
determining an angle $\alpha_2$ between $MV_{current\_t}$ and $MV_{current\_t-1}$ by the following formula:
$\alpha_2 = \arccos(dot(MV_{current\_t-1}, MV_{current\_t}))$; and
when $|\alpha_1 - \alpha_2| \le a$, determining the second search range according to the angle $\alpha_2$, wherein a value range of a is $[\pi/10, \pi/4]$.

12. The non-transitory computer-readable storage medium according to claim 11, wherein determining the second search range according to the angle $\alpha_2$ comprises:
when $\alpha_2$ is within $(0, \pi/2)$, determining that the second search range is all search points within the first quadrant of the target macroblock;
when $\alpha_2$ is within $(\pi/2, \pi)$, determining that the second search range is all search points within the second quadrant of the target macroblock;
when $\alpha_2$ is within $(\pi, 3\pi/2]$, determining that the second search range is all search points within the third quadrant of the target macroblock; and
when $\alpha_2$ is within $(3\pi/2, 2\pi]$, determining that the second search range is all search points in the fourth quadrant of the target macroblock.

\* \* \* \* \*